Patented Nov. 8, 1932

1,886,941

UNITED STATES PATENT OFFICE

GEORGE E. CORSON AND ARTHUR P. BRYANT, OF CLINTON, IOWA, ASSIGNORS TO CLINTON CORN SYRUP REFINING COMPANY, OF CLINTON, IOWA, A CORPORATION OF IOWA

METHOD OF MAKING CRYSTALLINE DEXTROSE

No Drawing.   Application filed November 30, 1927.   Serial No. 236,876.

This invention relates in general to the manufacture of grape sugar from starch, and in particular to the method of producing sugar in crystalline form from the starch.

In the manufacture of hydrate crystalline grape sugar from dextrose solutions it has generally been desirable to produce, whenever possible, large crystals or large aggregates of crystals of uniform size. While, of course, other advantages such as whiteness, large yield, etc. were striven for, so far as the shape and size of the crystals were concerned it has been found most desirable to obtain crystals or aggregates which were of large and uniform size so that in the centrifuging process the hydrol, or corn sugar molasses, would be readily separated from the crystals, leaving in the basket a mass of crystals which could be readily washed with water to remove the non-sugars without dissolving any large amount of the crystallized sugar.

Heretofore sugar manufacturers have obtained satisfactory crystals from starch-converted solutions containing at least 84% of dextrose based on dry substances and which had been concentrated to densities of 38° to 42° Bé., but they have not had the same success with solutions having densities less than 38° Bé. The less dense solutions were found to yield crystals which were small and many of which were of needle-like shape. These crystals formed a mass on the wall of a centrifugal machine so dense as to retard the satisfactory centrifugal removal of the non-sugars.

The starch converted solutions which grape sugar manufacturers have hertofore used from which they crystallized hydrous dextrose crystals or anhydrous dextrose crystals were the products of well known commonly employed acid-conversion processes which included the usual bone black filtration for purification. Naturally in order to obtain as high as possible a yield of crystals from a given quantity of starch it was cus'omary to carry the conversion of starch into dextrose as far as practicable and in the past the conversion has been carried to the extent of producing from 84 to 87% of dextrose, or even a little more, as based on dry substances. This invention is not concerned with the acid-conversion process which produces the dextrose solution suitable for commercial crystallization. It is sufficient to say that we use a dextrose solution having naturally a high percentage of dextrose which would make it commercially practical for the efficient production of dextrose crystals.

Accordingly the common practice has been to use concentrated syrups, or solutions, of 39° Bé., and above, in order to obtain yields of large crystals. But the use of these more dense solutions introduced a disadvantage not so apparent in the lighter densities. The viscosities of the liquors were found to increase rapidly as their densities were increased above 39° Bé. These more viscous liquors were, therefore, more difficult to handle, the danger of premature crystallization with the promotion of anhydrous and other undesired crystals was also more imminent. Even when a good yield of crystals was obtained, the more viscous hydrol was not easily separated from the crystals in the centrifuging machine. The centrifugal flow of these more viscous hydrols through the crystals was less satisfactory than the flow of the hydrols resulting from syrups having densities below 39° Bé. It was also difficult to wash these more viscous non-sugars from the crystals. A large amount of wash water was necessary and too high a percentage of the crystallized sugar was dissolved and carried off in the wash water. Hence with the advantage of obtaining larger and better crystals from the more dense dextrose solutions there attended the disadvantages of manipulating more viscous syrups and hydrols.

However, we have found that by means of the hereinafter described process we can obtain uniformly large hydrate crystals with great ease not only from dextrose solutions which have been concentrated to densities above 39° Bé. but also from dextrose solutions which have been concentrated to densities of much less than 39° Bé.

One of the objects of our invention is to provide a process for the production of crystalline grape sugar from starch converted dextrose solutions which will yield uniformly large crystals or aggregates of crystals from solutions having specific gravities ranging between 35 and 43° Bé.

Another object of our invention is to provide a method of producing uniformly large crystals from starch converted dextrose solutions which have a low viscosity most favorably suited for manipulation during crystallization and during the separation of the crystals from the hydrol.

Another object of this invention is to provide a method of making crystalline grape sugar which produces large crystals suited to centrifuging and at the same time hydrols of low viscosity excellently adapted for separation from the crystals by centrifugal action and washing.

Another object of this invention is to provide a method of producing satisfactory yields of large and well formed hydrate grape sugar crystals from syrups lighter than 39° Bé. and crystallized at temperatures well below 95° F.

Another object of this invention is to provide a method of producing satisfactory yields of large and well formed grape sugar crystals in which method the major portion of the crystals are formed in a quiescent syrup.

Another object of this invention is to provide a method of obtaining crystalline grape sugar from dextrose solutions making possible the production of large yields of well formed hydrous crystals and avoiding the danger of contamination of this sugar by anhydrous crystals.

Other objects, advantages and capabilities are inherently possessed by this invention and will later become apparent.

In utilizing this invention, as applied to corn sugar refining, the dextrose solution after appropriate filtering is finally concentrated in a vacuum pan to a density ranging between 35 and 43 Bé. In concentrating a dextrose solution it is the usual practice to conduct the final concentration of the syrup at temperature below 140° F. usually between 130° and 135° F. It is not only more economical to evaporate the syrup at this low temperature range under a vacuum than to evaporate the syrup at higher temperatures in vacuo or otherwise but by maintaining the syrup at this low temperature during the evaporation period there is prevented any discoloration of the syrup due to inversion of the sugars, caramellizing and other harmful effects which follow from the use of temperatures substantially higher than 140° F. If the concentration were conducted above 155° F. the syrup would become yellowish in color and it would be commercially practically impossible to entirely purge the crystals of this discolored liquor, thus yielding a yellowish sugar instead of the pure white sugar which is obtained from our process and which is obtained from other processes which concentrate in vacuo below 140° F. When the desired density has been reached the solution is then raised from the temperature which it then has, usually somewhat below 140° F., to a higher temperature above 140° F. and preferably to about 160° F. At least thus far we have discovered that 160° F. is a very satisfactory temperature to be attained in the re-heating step. The solution after re-heating is then cooled to a crystallizing temperature. We have found that the solution often needs to have its density re-adjusted when being re-heated and preferably the density will be adjusted, whenever necessary, to bring it within 35° to 43° Bé. The solution is then cooled rapidly, and, if desired, it may be stirred while it is being cooled in order to hasten the cooling. At a suitable temperature the syrup is allowed to crystallize.

The temperature which is most favorable for crystallization of large uniformly sized crystals will vary with the density of the solution and accordingly the operator determines upon the best crystallizing temperature after he has ascertained the density of the solution which is being cooled. We have found the best results are obtained by using solutions having densities between 35° and 40° Bé. and that if the solution has, for example, a density of 37° Bé. it should be cooled rapidly down to about 90° F. and then gradually reduced to about 80° F. The crystals which result from using a 37° Bé. solution and re-heating it and crystallizing as above indicated are large, uniform in size, are almost entirely hydrous and contain practically none of the small and needle-like crystals. The cooling of the liquor down through the range of temperatures at which anhydrous crystals most readily form has been so rapid that there is slight danger of the formation of the anhydrous crystals, and results indicate that very few are formed. When this process is used the crystallization proceeds more rapidly than has been the case in processes heretofore used, in fact, we find that satisfactory crystallization occurs in about one-half the time required by the other processes.

The large crystals and large aggregates of crystals which result from our process, when applied to a 37° Bé. solution, comprise a yield considerably higher in quantity than is obtained from a 37° Bé. solution that has not been re-heated. Furthermore, whatever the density of the syrup treated may be, when the re-heating step is omitted the crystals are much smaller, the aggregates are much smaller, and there are more of the finer needle-like crystals. The crystals produced by this process are easily separated in the centrifugal machine because of their generally large hexagonal and rhomboidal shape. The hydrol flows freely through the interstices of the crystalline mass, and this is especially true where the lower density solutions have been crystallized. Hence this process is particularly well adapted to crystallizing of the lower gravity solutions whereas in the past good crystals and easy separation of them has been satisfactorily obtained only with the high gravity solutions having densities usually ranging from 40° to 42° Bé. This new process yields new and satisfactory results with solutions of all the densities between 35 and 43° Bé. but its advantages are perhaps most evident when operating with densities below 40° Bé. such as for instance 38, 37 and 36° Bé.

Furthermore, where the low gravity solutions are used and these large crystals are formed, the washing in the centrifugal requires less time than has heretofore been consumed in the washing of the crystals not formed by this process. This means the use of less water to obtain clean white crystals and consequently less of the sugar crystals are dissolved by the wash water.

Another singular feature of this invention is observed during the crystallizing period. If the re-heating step were omitted and a solution of the same density were crystallized the best crystals would be obtained if the syrup were stirred while the crystals are forming, but we find that when our process is being used there should be no or very little motion imparted to the mass during the period of formation of the crystals. Whereas in other processes stirring aids the growth of crystals, in our process stirring or at least any considerable amount of stirring is detrimental to the formation of crystals. It is necessary, of course, when the crystals have formed in the ordinary crystallizer, to stir up the mass after satisfactory crystallization has been completed in order to break up the rather solid mass so that it may be caused to flow through the outlet and be conducted to the centrifugal machine.

It has also been found that by using this process 70 sugar or 80 sugar or other impure sugars may be re-melted and re-heated to 160° F. The gravity of the re-heated solution can then be adjusted to between 35° and 43° Bé. and thereafter, when the cooling and crystallizing is carried out as indicated above, there results, not 70 or 80 sugar or the form of sugar which formerly existed, but large, well formed crystals and aggregates of crystals which are almost entirely hydrous and which are easily and economically separated from the hydrol.

In performing this new process the growth of crystals is promoted and aided by seeding the syrup at a temperature somewhere near the crystallizing temperature, or somewhat above that temperature, or at the upper range of the crystallizing temperatures suitable to the density of the liquor which is being crystallized. It is best to stir the seed quite thoroughly into the mass in order to obtain the best results. We find however that, though refined hydrous crystals of the type desired are excellent as seed for subsequent production of hydrous crystals in the syrup, almost any other type of corn sugar crystals may be used also with excellent results.

Crystallization in the crystallizing tank is allowed to proceed until there is obtained the maximum growth of crystals consistent with ease of subsequent manipulation to and in the centrifugal. Should the crystal growth be allowed to proceed too far the entire mass would become semi-solid and could not be removed easily from the crystallizer and delivered to the centrifugal. Hence the crystallization will be stopped at the point where the mass is still sufficiently fluid to be transferred into the centrifugal and properly washed to remove the corn molasses or hydrol. Hence in the claims where it is stated that crystallization is continued until the desired amount of crystallization has been completed it is meant that the crystallization will continue until the above desirable conditions are reached. The crystals obtained by following this process are substantially all hydrous dextrose and are of the plate-like form appearing either as single plates or in groups of plates adhering to each other in clusters. There is no substantial amount of needle-like or small crystals formed, and since the crystals are all relatively large and of the plate-like form and arranged in aggregates of crystals the hydrol will freely flow from between them when the magma is being spun in the centrifugal. Also the water used for washing the crystals will flow readily between them to wash away any adhering hydrol.

It should be understood that all of the densities mentioned above and in the claims which follow are the densities which the solutions named would have at 100° F.

Having fully described our invention we claim:

1. A method of making hydrate crystalline dextrose comprising concentrating to a density between 35° and 40° Bé. a starch-converted dextrose solution, completing the concentration at a temperature substantially below 160° F., raising the temperature of the solution to about 160° F., and thereafter quickly cooling the solution to a temperature productive of supersaturation favorable to the rapid growth of hydrous crystals, the cooling being conducted rapidly enough to avoid the danger of the growth of anhydrous crystals and also avoiding any apparent formation of crystals of any kind during the cooling, seeding the solution with crystalline dextrose after said cooling, maintaining the solution quiescent at temperatures below 95° F. until a desired amount of a uniform mass of plate-like hydrate dextrose crystals is formed, and thereafter centrifuging the solution to separate the crystals from the hydrol.

2. The process of obtaining a hydrous crystalline grape sugar from a dextrose solution produced by conversion of starch, comprising concentrating the converted dextrose solution in vacuo at or below 140° F. to a density between 35° and 40° Bé., reheating the concentrated solution under atmospheric pressure to a temperature substantially above 140° F. but not high enough to caramelize the solution, thereafter quickly cooling the reheated solution to a temperature below 100° F. productive of supersaturation favorable to the rapid growth of hydrous crystalline dextrose, seeding the cool solution with hydrous crystals and maintaining the cool syrup at temperatures favorable to said crystallization until a desired amount of plate-like hydrous crystals of substantially like size are formed, and thereafter separating the syrup from the crystals by centrifugal action.

3. A method of making hydrate crystalline dextrose comprising maintaining for a short period of time at a temperature substantially above 140° F. but at lower than its caramelizing temperature a concentrated starch-converted dextrose solution which has been concentrated at or below 140° F. to a density between 35° and 40° Bé., thereafter cooling the solution quickly to temperatures below 100° F. productive of supersaturation causing the rapid growth of a uniform mass of relatively large plate-like hydrate crystals, maintaining the last said temperatures until the desired amount of crystal growth is formed, and thereafter centrifuging the solution to separate the crystals from the hydrol.

4. A method of making hydrate crystalline dextrose comprising maintaining for a short period of time a temperature substantially above 140° F. in a starch-converted dextrose solution which has a density between 35° and 40° Bé., thereafter quickly cooling the solution to a temperature below 95° F., maintaining the solution at a temperature below 95° F. quiescent substantially all of the time until a substantially uniform mass of relatively large plate-like hydrate crystals has grown in the solution, continuing crystallization in said manner to produce the maximum crystal growth of said character consistent with good centrifuging, and thereafter centrifuging the solution to separate the crystals from the hydrol.

5. A method of making plate-like hydrate dextrose crystals comprising maintaining for a short period of time a temperature substantially above 140° F. in a starch-converted dextrose solution having a density of substantially less than 38° Bé. and more than 35° Bé., thereafter cooling the solution to a temperature below 95° F., seeding the solution with crystalline dextrose at approximately 95° F., maintaining this solution below 95° F. quiescent during substantially the entire crystallization period until a satisfactory magma containing a substantially uniform mass of relatively large plate-like hydrate dextrose crystals is formed, and thereafter centrifuging the magma to separate the crystals from the hydrol.

6. A method of obtaining hydrate dextrose crystals from a dextrose solution produced by conversion of starch comprising concentrating the solution to a density between 35° and 40° Bé. by evaporation at a temperature substantially below 160° F., thereafter heating the solution to about 160° F., then rapidly cooling the solution to a temperature range productive of supersaturation and favorable to the rapid growth of a uniform mass of relatively large plate-like hydrate dextrose crystals, maintaining the solution at said range until the desired crystal growth is completed, and centrifuging the magma to separate the crystals from the hydrol.

7. A method of obtaining hydrate dextrose crystals from a dextrose solution produced by conversion of starch comprising concentrating the solution to a density between 35° and 43° Bé. by evaporation at a temperature substantially below 160° F., thereafter heating the solution to about 160° F., then rapidly cooling the solution to a temperature range productive of supersaturation and favorable to the rapid growth of a uniform mass of relatively large plate-like hydrate dextrose crystals, maintaining the solution at said range until the desired crystal growth is completed, and centrifuging the magma to separate the crystals from the hydrol.

8. A method of obtaining hydrate dextrose crystals from a dextrose solution produced by conversion of starch comprising concentrating the solution to a density between 35° and 40° Bé. by evaporation at a temperature substantially below 160° F., thereafter heating the solution to about 160° F., then rapidly cooling the solution with agitation to a temperature range productive of supersaturation and favorable to the rapid growth of a uniform mass of relatively large plate-like hydrate dextrose crystals, maintaining the solution at said range until the desired crystal growth is completed, and centrifuging the magma to separate the crystals from the hydrol.

9. A method of obtaining hydrate dextrose crystals from a dextrose solution produced by conversion of starch comprising concentrating the solution to a density between 35° and 43° Bé. by evaporation at a temperature substantially below 160° F., thereafter heating the solution to about 160° F., then rapidly cooling the solution to a temperature range productive of supersaturation and favorable to the rapid growth of a uniform mass of relatively large plate-like hydrate dextrose crystals, seeding the solution with sugar crystals subsequently to the inauguration of cooling, maintaining the solution at said range until the desired crystal growth is completed, and centrifuging the magma to separate the crystals from the hydrol.

10. A method of obtaining hydrate dextrose crystals from a dextrose solution produced by conversion of starch comprising concentrating the solution to a density between 35° and 40° Bé. by evaporation at a temperature substantially below 160° F., thereafter heating the solution to about 160° F., then rapidly cooling the solution to a temperature range productive of supersaturation and favorable to the rapid growth of a uniform mass of relatively large plate-like hydrate dextrose crystals, maintaining the solution substantially quiescent at said range until the desired crystal growth is completed, and centrifuging the magma to separate the crystals from the hydrol.

11. A method of obtaining hydrate dextrose crystals from a dextrose solution produced by conversion of starch comprising concentrating the solution to a density between 35° and 40° Bé. by evaporation at a temperature below 140° F., thereafter heating the solution to a temperature substantially above 140° F. but lower than its caramelizing temperature, then rapidly cooling the solution to a temperature range unfavorable to the growth of anhydrous crystals and favorable to the rapid growth of a uniform mass of relatively large plate-like hydrate crystals, maintaining the solution at said range until the desired crystal growth is completed, and centrifuging the magma to separate the crystals from the hydrol.

12. A method of obtaining hydrate dextrose crystals from a dextrose solution produced by conversion of starch comprising concentrating the solution to a density above 35° F. but less than 38° Bé. by evaporation at a temperature below 140° F., thereafter heating the solution to a temperature substantially above 140° F. but lower than its caramelizing temperature, then rapidly cooling the solution to a temperature range unfavorable to the growth of anhydrous crystals and favorable to the rapid growth of a uniform mass of relatively large plate-like hydrate crystals, maintaining the solution at said range until the desired crystal growth is completed, and centrifuging the magma to separate the crystals from the hydrol.

13. A method of obtaining hydrate dextrose crystals from a dextrose solution produced by conversion of starch comprising concentrating the solution to a density above 35° Bé. but less than 38° Bé. by evaporation in vacuo sufficiently below 160° F. to avoid discoloration of the solution by excessive heat, thereafter raising the temperature of the solution to about 160° F., then rapidly cooling the solution to about 95° F., seeding the solution with sugar crystals after inauguration of the cooling step, holding the solution below 95° F. until a uniform mass of relatively large plate-like crystals in a desired amount is formed, and centrifuging the magma to separate the crystals from the hydrol.

14. A method of obtaining hydrate dextrose crystals from a dextrose solution produced by conversion of starch comprising concentrating the solution to a density between 35° and 38° Bé. by evaporation at a temperature sufficiently low to avoid discoloration of the solution by excessive heat, thereafter raising the temperature substantially above 140° F. but avoiding caramelizing at the raised temperature, then cooling the solution rapidly to below 100° F., seeding the solution with sugar crystals after cooling has at least substantially progressed, maintaining the temperature of the solution below 95° F. until a uniform mass of relatively large plate-like hydrate crystals has been formed in the desired amount, and thereafter centrifuging the solution to separate the crystals from the hydrol.

15. A method of making hydrate crystalline dextrose comprising heating from a substantially lower temperature to about 160° F. a starch-converted dextrose solution having a density between 35° and 40° Bé., thereafter rapidly cooling the reheated solution to a temperature range favorable to the rapid growth of a uniform mass of relatively large plate-like hydrate dextrose crystals, maintaining the solution at said temperature range until the desired amount of crystallization has been completed, and thereafter centrifuging the magma to separate the crystals from the hydrol.

16. A method of making hydrate crystalline dextrose comprising heating from a substantially lower temperature to about 160° F. a starch-converted dextrose solution having a density between 35° and 38° Bé., thereafter rapidly cooling the reheated solution to a temperature range favorable to the rapid growth of a uniform mass of relatively large plate-like hydrate dextrose crystals, maintaining the solution at said temperature range until the desired amount of crystallization has been completed, and thereafter centrifuging the magma to separate the crystals from the hydrol.

17. A method of obtaining hydrate dextrose crystals from a dextrose solution produced by conversion of starch comprising concentrating the solution to a density between 35° and 43° Bé. by evaporation at a temperature substantially below 160° F., thereafter raising the temperature of the hot concentrated solution to about 160° F., then rapidly cooling the solution to a temperature range unfavorable to the production of anhydrous crystals but favorable to the growth of a uniform mass of large plate-like hydrate crystals substantially unmixed with anhydrous or needle-like crystals, maintaining the solution within said range until the crystal growth has been completed, and thereafter separating the crystals from the hydrol.

18. A method of obtaining hydrate dextrose crystals from a dextrose solution produced by conversion of starch comprising concentrating the solution to a density between 35° and 38° Bé. by evaporation at a temperature substantially below 160° F., thereafter heating the solution to a temperature of about 160° F. but avoiding caramelizing at the elevated temperature, rapidly cooling the solution to a temperature below 100° F., and maintaining the solution below 100° F. until there has been formed a desired uniform mass of large plate-like hydrate crystals substantially unmixed with anhydrous and needle-like crystals, and centrifuging the magma to separate the crystals from the hydrol.

19. A method of obtaining hydrate dextrose crystals from a dextrose solution produced by conversion of starch comprising concentrating the solution to a density between 35° and 38° Bé. by evaporation at a temperature substantially below 160° F., thereafter heating the solution to a temperature of about 160° F. but avoiding caramelizing at the elevated temperature, rapidly cooling the solution to a temperature below 100° F., and maintaining said solution substantially quiescent below 100° F. until there has been formed a desired uniform mass of large plate-like hydrate crystals substantially unmixed with anhydrous and needle-like crystals, and centrifuging the magma to separate the crystals from the hydrol.

20. A method of obtaining hydrate dextrose crystals from a dextrose solution produced by conversion of starch comprising concentrating the solution to a density between 35° and 43° Bé. by evaporation at a temperature sufficiently low to avoid discoloration of the solution by excessive heat, thereafter heating the solution to a temperature substantially above 140° F. but avoiding caramelizing by excessive heat, then cooling the solution rapidly to below 100° F., seeding the solution with sugar crystals after cooling has at least substantially progressed, maintaining the temperature of the solution well below 100° F. until a uniform mass of relatively large plate-like hydrate crystals substantially unmixed with anhydrous and needle-like crystals has been formed in the desired amount, and thereafter centrifuging the solution to separate the crystals from the hydrol.

In witness of the foregoing we affix our signatures.

GEORGE E. CORSON.
ARTHUR P. BRYANT.